(12) United States Patent
Zhang et al.

(10) Patent No.: US 7,343,095 B2
(45) Date of Patent: Mar. 11, 2008

(54) OPTICAL INTERLEAVER

(75) Inventors: Ying Zhang, Singapore (SG); Qi Jie Wang, Singapore (SG); Yeng Chai Soh, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 628 days.

(21) Appl. No.: 10/862,827

(22) Filed: Jun. 7, 2004

(65) Prior Publication Data

US 2005/0271323 A1 Dec. 8, 2005

(51) Int. Cl.
*H04J 14/02* (2006.01)

(52) U.S. Cl. .......................................... 398/82; 398/85

(58) Field of Classification Search ................. 398/82, 398/83, 85
See application file for complete search history.

(56) References Cited

U.S. PATENT DOCUMENTS 6,222,958 B1* 4/2001 Paiam ........................ 385/24
7,206,477 B2* 4/2007 Madsen ........................ 385/24
2002/0126291 A1* 9/2002 Qian et al. ................... 356/450

OTHER PUBLICATIONS

Wang et al.; All-Fiber 3×3 Interleaver Design With Flat-Top Passband; IEEE Photonics Technology Letters; Jan. 2004; pp. 168-170; vol. 16, No. 1; U.S.A.

* cited by examiner

*Primary Examiner*—Christina Leung
(74) *Attorney, Agent, or Firm*—Christie, Parker & Hale, LLP

(57) ABSTRACT

An optical interleaver comprising a first optical 3×3 coupler for receiving a broadband optical signal at one input port thereof, a second 3×3 optical coupler, three differential delay lines connected in parallel port-to-port between output ports of the first optical 3×3 coupler and input ports of the second optical 3×3 coupler, an infinite impulse response (IIR) element disposed in each of two of the delay lines, and wherein optical signals travelling in the respective delay lines interfere at the second 3×3 coupler to produce three frequency shifted transmission channel output signals at respective output ports of the second 3×3 coupler.

21 Claims, 4 Drawing Sheets a)

b)

a) b)

OPTICAL INTERLEAVER

FIELD OF INVENTION

The present invention relates broadly to optical interleavers, and to a method of filtering an optical signal.

BACKGROUND

Optical passband filters are important components in for example wavelength division multiplexing (WDM) systems to provide various optical signal processing functions such as multi/de-multiplexing optical data, balancing the signal power, and adding/dropping channels. The practical applications of optical bandpass filters require that the filters shall have flat passband transmission, wide bandwidth, and high band isolation.

As a class of important bandpass filters, optical interleavers which fundamentally function as optical filter banks have attracted significant attention recently. Unlike the single-input-single-output bandpass filters, an optical interleaver can offer several channels of phase-shifted bandpass transmissions simultaneously at different outputs.

Several conventional techniques have been proposed for interleaver designs. These include Mach-Zehnder based interleavers, Michelson-Gires-Tournois interleavers (MGT), Birefrigent-Gires-Tournois interleavers (BGT) and compound etalon interleavers.

One common drawback of the above mentioned interleaver design schemes is that they cannot be implemented by an all-fibre structure. In optical communication systems, using all-fibre instruments can decrease the insertion and connection losses where optical devices are connected serially. In addition, all-fibre implementations can provide further advantages such as uniform response over a wide wavelength range, very low dispersion and low polarisation dependence.

Furthermore, most of the conventional interleavers proposed so far have been limited to only two ports structures. In order to achieve high channel counts for a communication system, a number of the conventional interleavers have to be cascaded. In practice, the insertion loss will increase with the number of interleaving filters being used. As a follow-on characteristic, only configurations of power-of-two are possible, and this limits the capability of such optical interleavers in multiplexing more complicated code in optical communications.

Recently, a three-port interleaver using a lattice configuration of 3×3 directional couplers was reported in "All fibre 3×3 interleaver design with flat-top passband," IEEE P. Technol. Lett., Vol. 16, pp. 168-170, 2004, by the present inventors. The disclosed interleaver is a Finite Impulse Response (FIR) filter having only feed-forward interference paths. Three cascaded 3×3 directional couplers are used in the disclosed interleaver.

It is with the knowledge of the above mentioned prior art interleaver design characteristics that the present invention has been made and is now reduced to practice.

SUMMARY

In accordance with a first aspect of the present invention there is provided an optical interleaver comprising a first optical 3×3 coupler for receiving a broadband optical signal at one input port thereof, a second 3×3 optical coupler, three differential delay lines connected in parallel port-to-port between output ports of the first optical 3×3 coupler and input ports of the second optical 3×3 coupler, an infinite impulse response (IIR) element disposed in each of two of the delay lines, and wherein optical signals travelling in the respective delay lines interfere at the second 3×3 coupler to produce three frequency shifted transmission channel output signals at respective output ports of the second 3×3 coupler.

Each IIR element may comprise a ring resonator.

The ring resonators may comprise optical fibres.

In accordance with a second aspect of the present invention there is provided an optical interleaver comprising an optical 3×3 coupler for receiving a broadband optical signal at one port thereof on one side thereof, three differential delay lines connected to respective ports at the other side of the optical 3×3 coupler, an infinite impulse response (IIR) element disposed in each of two of the delay lines, an all-pass reflector element disposed in each delay line, and wherein optical signals travelling in the respective delay lines interfere at the 3×3 coupler to produce three frequency shifted transmission channel output signals at respective ports on the first side of the 3×3 coupler.

Each IIR element may comprise an etalon cavity.

The etalon cavity may comprise a partial reflector element at one end and the all-pass reflector element at the other end.

The partial reflector element may comprise a Bragg grating.

The all-pass reflector element may comprise a Bragg grating or a mirror.

In both aspects, differential delays between the three delay lines may be $\Delta L$, 0, and $-\Delta L$.

The 3×3 couplers may comprise optical fibre couplers.

The delay lines may comprise optical fibres.

The optical 3×3 couplers may comprise symmetric 3×3 optical couplers.

The three frequency shifted transmission channels output signals may have a shift of $2\pi/3$ in frequency.

In accordance with a third aspect of the present invention there is provided an all-fibre optical interleaver comprising a first optical fibre 2×2 coupler for receiving a broadband optical signal at one input port thereof, a second optical fibre 2×2 optical coupler, two differential optical fibre delay lines connected in parallel port-to-port between output ports of the first optical 2×2 coupler and input ports of a second optical fibre 2×2 coupler, an infinite impulse response (IIR) element disposed in one of the optical fibre delay lines, and wherein optical signals travelling in the respective optical fibre delay lines interfere at the second 2×2 coupler to produce two frequency shifted transmission channel output signals at respective output ports of the second 2×2 coupler.

In accordance with a fourth aspect of the present invention there is provided an all-fibre optical interleaver comprising an optical fibre 2×2 coupler for receiving a broadband optical signal at one port thereof on one side thereof, two differential optical fibre delay lines connected to respective ports at the other side of the 2×2 coupler, an infinite impulse response (IIR) element disposed in one of the optical fibre delay lines, an all-pass reflector element disposed in each delay line, and wherein optical signals travelling in the respective delay lines interfere at the 2×2 coupler to produce two frequency shifted transmission channel output signals at respective ports on the first side of the 2×2 coupler.

In accordance with a fifth aspect of the present invention there is provided a method of filtering an optical signal, the method comprising receiving the optical signal at one input port of a first optical 3×3 coupler, coupling the optical signal into three differential delay lines connected in parallel port-to-port between output ports of the first optical 3×3 coupler and input ports of a second optical 3×3 coupler, subjecting the coupled signals in two of the delay lines to an infinite impulse response (IIR) element, and interfering the coupled signals in the three delay lines at the second 3×3 coupler to produce three frequency shifted transmission channel output signals at respective output ports of the second 3×3 coupler.

In accordance with a sixth aspect of the present invention there is provided a method of filtering an optical signal, the method comprising receiving the broadband optical signal at one port of an optical 3×3 coupler, coupling the optical signal into three differential delay lines connected to respective ports at the other side of the optical 3×3 coupler, subjecting the coupled signals in two of the delay lines to respective infinite impulse response (IIR) elements, reflecting the coupled signals in the three delay lines at respective all-pass reflector elements, and interfere the coupled signals in the three delay lines at the 3×3 coupler to produce three frequency shifted transmission channel output signals at respective ports on the first side of the 3×3 coupler.

In the fifth and sixth aspects the differential delays between the three delay lines may be $\Delta L$, 0, and $-\Delta L$.

The optical 3×3 couplers may comprise symmetric optical 3×3 couplers.

The three frequency shifted transmission channels output signals may have a shift of $2\pi/3$ in frequency.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 1a) is a schematic drawing illustrating the configuration of an interleaver in accordance with an embodiment of the present invention.

FIG. 1b) is a schematic drawing illustrating a schematic, equivalent configuration of the interleaver of FIG. 1.

DETAILED DESCRIPTION

Figure 1:
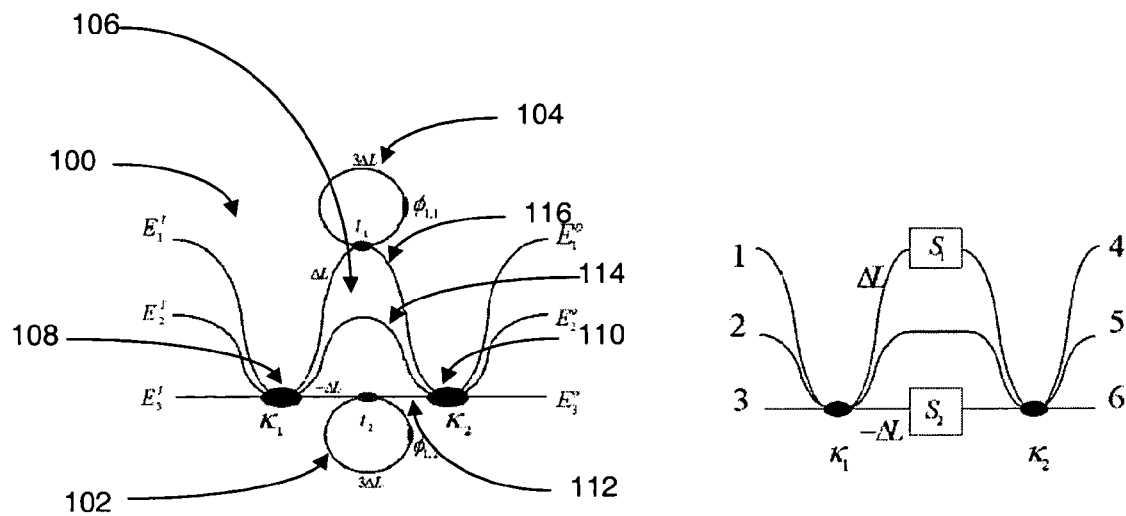
FIG. 1, includes FIGS. 1a and 1b

FIG. 1 is a schematic drawing illustrating the configuration of an Infinite Impulse Response (IIR) 3-port interleaver 100 in an example embodiment of the present invention. The interleaver 100 is formed by embedding two ring resonators 102 and 104 in a 3×3 Mach-Zehnder interferometer (MZI) structure 106. The MZI 106 consists of two 3×3 directional couplers 108, 110 linked port-to-port by three differential delay paths 112, 114 and 116. The three delays in the respective delay paths 112, 114 and 116 are chosen as $\Delta L$, 0 and $-\Delta L$, respectively. The length difference $\Delta L$ determines the channel spacing of the interleaver 100, e.g. a length difference of approximate 2 mm corresponds to a 0.8 nm channel spacing in the example embodiment. In the delay paths 112, 116 with the two differential delays of $\Delta L$ and $-\Delta L$ in the MZI 106, all-pass ring resonators 102, 104 with a path length of 3 $\Delta L$ are embedded respectively. Each resonator 102, 104 couples into the differential delay path 112, 116 respectively, with a coupling radio $a_i$. In each of the resonators 102 and 104, a phase shift $\phi_{1,i}$ (i=1,2) is introduced.

For this configuration, the three channels of transmissions can be obtained from one input port to three output ports. Without loss of generality, the transmissions from the input port $E^I_1$ to the three output ports $E^o_1$, $E^o_2$ and $E^o_3$ are considered. To obtain three channels of identical but $2\pi/3$ phase-shifted transmissions satisfying desired specifications, the interleaver is designed by choosing appropriate parameters including the coupling ratios $k_i$ (i=1, 2) of two 3×3 fibre couplers, the phase shifts $\phi_{1,i}$ (i=1, 2) in ring resonators, and the ring-to-path coupling ratios $a_i$ (i=1, 2). To this end, the three channels of transmissions are expressed into the functions of the design parameters.

It has been shown that for a 3×3 optical fiber coupler, the input optical fields and the output fields of a symmetric 3×3 coupler can be related by a 3×3 transfer matrix $M(\kappa)$ as follows:

$$\begin{pmatrix} E^o_1 \\ E^o_2 \\ E^o_3 \end{pmatrix} = \begin{pmatrix} \gamma & \delta & \delta \\ \delta & \gamma & \delta \\ \delta & \delta & \gamma \end{pmatrix} \begin{pmatrix} E^I_1 \\ E^I_2 \\ E^I_3 \end{pmatrix} = M(\kappa) \begin{pmatrix} E^I_1 \\ E^I_2 \\ E^I_3 \end{pmatrix} \quad (1)$$

where $E^o_m$ and $E^I_m$ represent respectively the input field and the output field at the m-th port for m=1, 2, 3. $|\gamma|^2$ and $|\delta|^2$ denote the through-port and the cross-port power coupling ratios of the 3×3 directional coupler.

They are given by $$\gamma = (e^{j2\kappa} + 2e^{-j\kappa})/3 \quad (2)$$

$$\delta = (e^{j2\kappa} - e^{-j\kappa})/3 \quad (3)$$

where j stands for $\sqrt{-1}$ and $\kappa$ is a product of the coupling coefficient c and the length of the coupling region L, i.e., k=c×L. As the three optical fibers are laid out symmetrically, the coupling coefficients between any pair of optical fibers are equal.

Next, we derive the transfer function of the differential lines with ring resonators. Denote z as a unit time delay given by $z^{-1} = e^{-j\Delta L\pi n/\lambda}$ where $\lambda$ is the wavelength of wave propagating through free space and n is the refractive index. For convenience of derivation, we represent the transmissions of two ring resonators by $S_1(z)$ and $S_2(z)$, respectively, shown in FIG. 1(b). The lossless ring resonator with a single coupler and a phase shifter is an all-pass filter. Its transfer function can be written as:

$$S_i(z^3) = e^{j\phi_{1,i}} \frac{t_i e^{-j\phi_{1,i}} - z^{-3}}{1 - t_i e^{j\phi_{1,i}} z^{-3}} \quad (4)$$

where $t_i = \sqrt{1-a_i}$ and $a_i$ is the bar-state coupling ratio of the single coupler on the i-th (i=1, 2) ring resonator.

Considering the differential delay caused by delay lines themselves, the transmission of the differential delay lines with ring resonators is obtained by $$D(z) = \begin{pmatrix} z^{-1}S_1(z^3) & 0 & 0 \\ 0 & 1 & 0 \\ 0 & 0 & z^1 S_2(z^3) \end{pmatrix} \quad (5)$$

Therefore, the normalized transfer functions from the three input electric fields to the three output electric fields can be expressed by the following transfer matrix:

$$\begin{pmatrix} E_1^o \\ E_2^o \\ E_3^o \end{pmatrix} = M(\kappa_2) D(z) M(\kappa_1) \begin{pmatrix} E_1^I \\ E_2^I \\ E_3^I \end{pmatrix} \quad (6)$$

Denote $H_1(z)$, $H_2(z)$, and $H_3(z)$ as the transmissions from the input port $E_1^I$ to the three output ports, $E_1^o$, $E_2^o$ and $E_3^o$ respectively. They can be expressed as the following equations:

$$H_1(z) = \gamma_1 \gamma_2 z^1 S_1(z^3) + \delta_1 \delta_2 + \delta_1 \delta_2 z^1 S_2(z^3) \quad (7)$$

$$H_2(z) = \gamma_1 \delta_2 z^1 S_1(z^3) + \delta_1 \gamma_2 + \delta_1 \delta_2 z^{-1} S_2(z^3) \quad (8)$$

$$H_3(z) = \gamma_1 \delta_2 z^1 S_1(z^3) + \delta_1 \delta_2 + \delta_1 \gamma_2 z^{-1} S_2(z^3) \quad (9)$$

Then, the 3×3 optical interleaver design problem can be described as one of determining appropriate design parameters such that the power spectra of $|H_1|^2$, $|H_2|^2$, and $|H_3|^2$ have a shift of $2\pi/3$ in frequency, but they have identical spectral shape, where $|H_i|^2$ (i=1, 2, 3) is the power transfer function in the proposed configuration. In addition, it is highly desired that the passbands and stopbands of $|H_1|^2$, $|H_2|^2$, and $|H_3|^2$ are as much isolated as possible to achieve good channel isolation, and more importantly, they should be as flat as possible in order to reduce power variations resulting from channel wavelength shifts.

To meet the first requirement to have identical passband/stopband spectral shape for all the three channels, the desired design parameters shall satisfy the following equations $$|H_1(z)|^2 = |H_2(ze^{-j2\pi/3})|^2 = |H_3(ze^{-j4\pi/3})|^2 \quad (10)$$

Clearly, there is a great deal of difficulty in solving these equations due to the complicate expressions of $S_i(z)$ (for i=1, 2) in (4) and $H_i(z)$ (for i=1, 2, 3) in (7)-(9). However, with the proposed structures of $S_i(z^3)$ (i=1, 2), we can solve (10) in an efficient way. It is seen from FIG. 1(a) that the path length of all-pass ring resonators are chosen as three times that of the unit differential length in the proposed interleaver design structure. Such a structure implies that the frequency response of the ring resonators $S_i(z^3)$ (i=1, 2) will not change with a shift of $2\pi/3$ or $4\pi/3$ in frequency. This can be seen directly from $$S_i(z^3) = S_i(ze^{-j2\pi/3})^3 = S_i((ze^{-j4\pi/3})^3) \quad (11)$$

Using this property, the first requirement of an interleaver can be easily fulfilled by choosing appropriate values for the design parameters $\kappa_i$ (i=1, 2). To see this, we substitute Eqns. (7), (8) and (9) into Eqn. (10), respectively. Then, the spectra in (10) can be expressed into the following forms:

$$|H_1(z)|^2 = \sum_{i=1}^{2}\sum_{j=1}^{2} a_{ij}^{(1)} z^{2j-2i} S_i(z^3) S_j^*(z^3) + \quad (12)$$
$$\sum_{j=1}^{2} b_j^{(1)} z^{3-2j} S_j(z^3) + \sum_{j=1}^{2} c_j^{(1)} z^{2j-3} S_j^*(z^3) + d^{(1)}$$

$$\left|H_2\left(ze^{-j\frac{2\pi}{3}}\right)\right|^2 = \sum_{i=1}^{2}\sum_{j=1}^{2} a_{ij}^{(2)} z^{2j-2i} S_i(z^3) S_j^*(z^3) + \quad (13)$$
$$\sum_{j=1}^{2} b_j^{(2)} z^{3-2j} S_j(z^3) + \sum_{j=1}^{2} c_j^{(2)} z^{2j-3} S_j^*(z^3) + d^{(2)}$$

$$\left|H_3\left(ze^{-j\frac{4\pi}{3}}\right)\right|^2 = \sum_{i=1}^{2}\sum_{j=1}^{2} a_{ij}^{(3)} z^{2j-2i} S_i(z^3) S_j^*(z^3) + \quad (14)$$
$$\sum_{j=1}^{2} b_j^{(3)} z^{3-2j} S_j(z^3) + \sum_{j=1}^{2} c_j^{(3)} z^{2j-3} S_j^*(z^3) + d^{(3)}$$

where the coefficients $a_{ij}^{(k)}$, $b_j^{(k)}$, $c_j^{(k)}$ and $d_j^{(k)}$ (for i=1, 2, j=1, 2, and k=1, 2, 3) are related to the design parameters $\kappa_1$ and $\kappa_2$ through (2) and (3) as follows:

$$\begin{cases} a_{11}^{(1)} = \gamma_1 \gamma_2 \gamma_1^* \gamma_2^*, & a_{12}^{(1)} = \gamma_1 \gamma_2 \delta_1^* \delta_2^*, & a_{21}^{(1)} = \delta_1 \delta_2 \gamma_1^* \gamma_2^*, \\ a_{22}^{(1)} = \delta_1 \delta_2 \delta_1^* \delta_2^*, \\ a_{11}^{(2)} = \gamma_1 \delta_2 \gamma_1^* \delta_2^*, & a_{12}^{(2)} = \gamma_1 \delta_2 \delta_1^* \gamma_2^* e^{j\frac{2\pi}{3}}, & a_{21}^{(2)} = \delta_1 \delta_2 \gamma_1^* \delta_2^* e^{-j\frac{2\pi}{3}}, \\ a_{22}^{(2)} = \delta_1 \delta_2 \delta_1^* \delta_2^*, \\ a_{11}^{(3)} = \gamma_1 \delta_2 \gamma_1^* \delta_2^*, & a_{12}^{(3)} = \gamma_1 \delta_2 \delta_1^* \gamma_2^* e^{-j\frac{2\pi}{3}}, & a_{21}^{(3)} = \delta_1 \gamma_2 \gamma_1^* \delta_2^* e^{j\frac{2\pi}{3}}, \\ a_{22}^{(3)} = \delta_1 \gamma_2 \delta_1^* \gamma_2^* \end{cases} \quad (15)$$

$$\begin{cases} b_1^{(1)} = \gamma_1 \gamma_2 \delta_1^* \delta_2^*, & b_2^{(1)} = \delta_1 \delta_2 \delta_1^* \delta_2^*, \\ b_1^{(2)} = \gamma_1 \delta_2 \delta_1^* \gamma_2^* e^{-j\frac{2\pi}{3}}, & b_2^{(2)} = \delta_1 \delta_2 \delta_1^* \gamma_2^* e^{j\frac{2\pi}{3}}, \\ b_1^{(3)} = \gamma_1 \delta_2 \delta_1^* \delta_2^* e^{j\frac{2\pi}{3}}, & b_2^{(3)} = \delta_1 \gamma_2 \delta_1^* \delta_2^* e^{-j\frac{2\pi}{3}}, \end{cases} \quad (16)$$

$$\begin{cases} c_1^{(1)} = \delta_1 \delta_2 \gamma_1^* \gamma_2^*, & c_2^{(1)} = \delta_1 \delta_2 \delta_1^* \delta_2^*, \\ c_1^{(2)} = \delta_1 \gamma_2 \gamma_1^* \delta_2^* e^{j\frac{2\pi}{3}}, & c_2^{(2)} = \delta_1 \gamma_2 \delta_1^* \delta_2^* e^{-j\frac{2\pi}{3}}, \\ c_1^{(3)} = \delta_1 \delta_2 \gamma_1^* \delta_2^* e^{-j\frac{2\pi}{3}}, & c_2^{(3)} = \delta_1 \delta_2 \delta_1^* \gamma_2^* e^{j\frac{2\pi}{3}}, \end{cases} \quad (17)$$

$$\begin{cases} d^{(1)} = \delta_1 \delta_2 \delta_1^* \delta_2^*; \\ d^{(2)} = \delta_1 \gamma_2 \delta_1^* \gamma_2^*; \\ d^{(3)} = \delta_1 \delta_2 \delta_1^* \delta_2^*; \end{cases} \quad (18)$$

Forcing $a_{ij}^{(1)} = a_{ij}^{(2)} = a_{ij}^{(3)}$, $b_j^{(1)} = b_j^{(2)} = b_j^{(3)}$, $c_j^{(1)} = c_j^{(2)} = c_j^{(3)}$ and $d_j^{(1)} = d_j^{(2)} = d_j^{(3)}$ it can be solved that when $\kappa_1 = 2\pi/9$ and $\kappa_2 = 4\pi/9$, equation (10) is satisfied regardless of $S_i(z)$. With these solutions to $k_1$ and $k_2$, we have $$H_1(z)\Big|_{\kappa_1=\frac{2\pi}{9},\kappa_2=\frac{4\pi}{9}} = e^{-j\frac{2\pi}{3}} H_2\left(ze^{-j\frac{2\pi}{3}}\right)\Big|_{\kappa_1=\frac{2\pi}{9},\kappa_2=\frac{4\pi}{9}} \quad (19)$$
$$= H_3\left(ze^{-j\frac{4\pi}{3}}\right)\Big|_{\kappa_1=\frac{2\pi}{9},\kappa_2=\frac{4\pi}{9}}$$

An immediate conclusion from this equation is that $|H_1|^2$, $|H_2|^2$, and $|H_3|^2$ have identical shapes with only a phase shift of $2\pi/3$ in frequency between each of them. Therefore, the problem of the three-port optical IIR interleaver design is converted into one of designing $S_i(z)$ (i=1, 2) such that any one of the channel transfer functions, e.g. $|H_1|^2$, satisfies the desired spectrum response. The filter design methods including those for the design of Butterworth, Chebyshev and Elliptic bandpass filters can be employed to determine the remaining design parameters such that the interleaving transmissions have desired spectral responses such as high channel isolation, flat passband, and wide bandwidth.

As a design example, the proposed IIR structure of the optical interleaver is designed to deliver three channels of transmissions which are interleaved by $2\pi/3$ with each other, and each passband bandwidth is chosen as 85% of the channel spacing at 0.5 dB. Following the two steps design scheme developed in the last section, the coupler ratios of the two 3×3 couplers are readily obtained as $k_1=2\pi/9$ and $k_2=4\pi/9$, respectively, so that the three channels of transmissions have identical spectral shapes but phase shifted by $2\pi/3$. Then, one of the transmissions, e.g., $H_1(z)$, is designed to satisfy the passband requirement. It is known from (7) that $H_1(z)$ is a sixth order IIR filter. Using the least-squares (LS) method, the desired transfer function of $H_1(z)$ can be obtained, and its numerator and denominator power expansion coefficients are listed in Table I.

Figure 2:
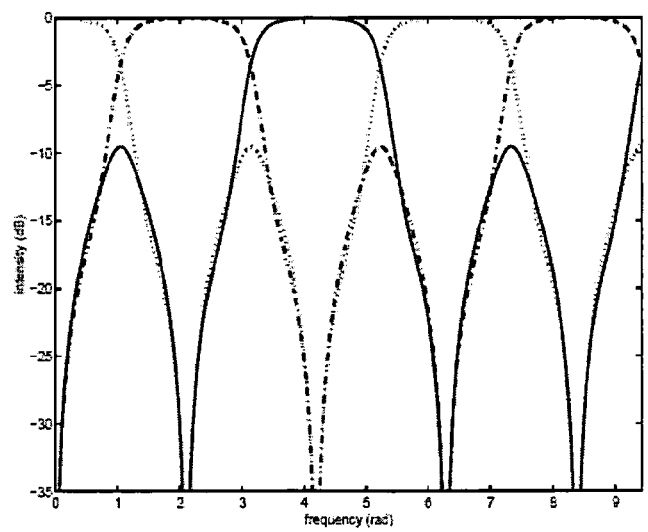
FIG. 2 shows power spectra of 3 outputs of the interleaver of FIG. 1.
Figure 3:
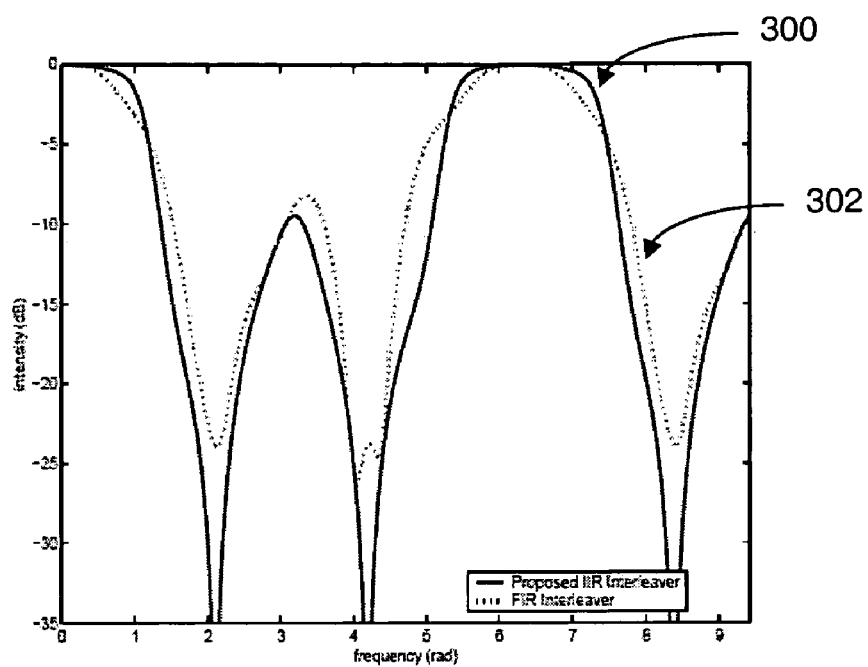
FIG. 3 shows a comparison between one channel power spectra of the interleaver of FIG. 1 and a prior art interleaver.

After obtaining the power expansion coefficients of $H_1(z)$, we determine the parameters of the ring resonators. The coupling ratios and phases for each ring resonator are easily calculated from the all-pass functions. For example, to produce a pole at $z_n$ requires a coupling ratio of $a_n=1-|z_n^3|^2$ and a phase of $\arg(z_n^3)$. Thus, by using Eqns (4) and (7), the design parameters of $t_i$ and $\phi_{1,i}$ (i=1, 2) are obtained and shown in Table I. With these design parameters, an IIR three-port interleaver is obtained with the specified performance. FIG. 2 shows the interleaving transmission spectrums of the designed IIR three-channel interleaver. To compare the performance quantitatively with the FIR three-channel interleaver proposed, the figure of merit (FOM) of the transmission is calculated. FOM is a common index used to evaluate performance of interleavers. It is defined as the ratio between the bandwidth at −25 dB and the bandwidth at −0.5 dB. A simple numerical calculation shows that the FOM of the IIR interleaver is 84.32%. It is increased by nearly 50% when compared to 56.2% FOM for the FIR interleaver. For a clear comparison, FIG. 3 displays one channel transmission of the proposed IIR three-port interleaver (curve 300) and the corresponding one of a prior art of the FIR interleaver (curve 302). It can be seen clearly that the passband transmission bandwidth and the channel isolation of the IIR interleaver are improved greatly. Furthermore, only two 3×3 couplers are required in the IIR optical interleaver, while three are used in the FIR interleaver. Therefore, it can be concluded that the proposed three-port IIR interleaver can achieve superior performance more efficiently than the FIR three-port interleavers.

TABLE I

Order of $z^{-k}$, Numerator Power Expansion Coefficients, Denominator Power Expansion Coefficients, and Circuit Parameters for Six Order IIR Three-Port Interleaver

| k ($z^{-k}$) | numerator power expansion coefficients | denominator power expansion coefficients | circuit parameters |
| --- | --- | --- | --- |
| 0 | 0.3651 | 1 | $t_1 = 0.3651$ |
| 1 | 1 | 0 | $t_2 = 1.0000$ |
| 2 | 1 | 0 | $\phi_{1,1} = 3.1269$ |
| 3 | 1 | 0.3651 | $\phi_{1,2} = 2.5209$ |
| 4 | 0.3651 | 0 | $\kappa_1 = 2\pi/9$ |
| 5 | 0.3651 | 0 | $\kappa_2 = 4\pi/9$ |

Figure 4:
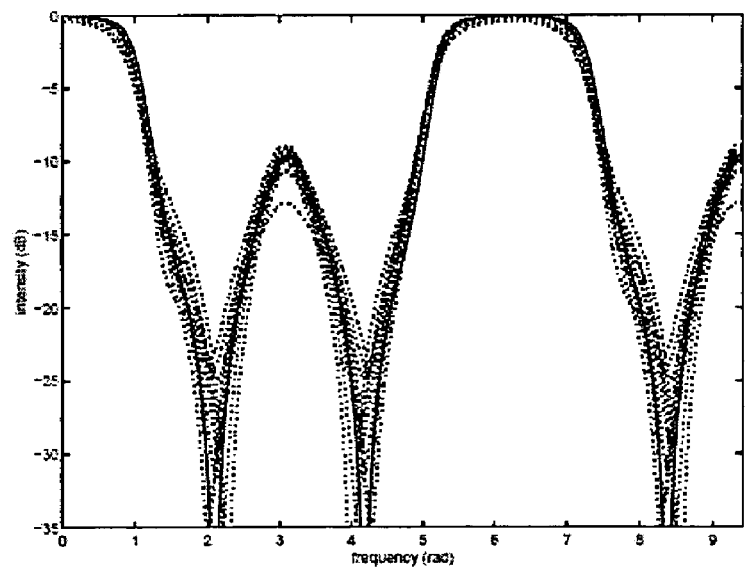
FIG. 4 shows one channel power spectra of the interleaver of FIG. 1 with design parameters bearing ±5% fabrication deviations in example embodiments.

In practice, the design parameters are subject to deviations during fabrication and the fiber coupling may suffer from certain loss, simulation studies are therefore carried out to investigate the sensitivity of the interleaver performance with respect to the design parameters and the insertion loss of the couplers. In the simulation, 5% tolerant deviations in the design parameters $k_i$, $t_i$ and $\phi_{1,i}$ (i=1, 2), respectively, are considered. The coupling loss is considered by substituting $\eta z^{-3}$ for $Z^{-3}$, where loss in decibels for one feedback path is $-20 \log 10(\eta)$. FIG. 4 shows the spectral responses of the interleaver with the design parameters and the coupling loss varying within the tolerant range. The results clearly showed that the performance of the proposed IIR interleaver is tolerant to deviation in both the design parameters and the coupling loss.

Figure 5:
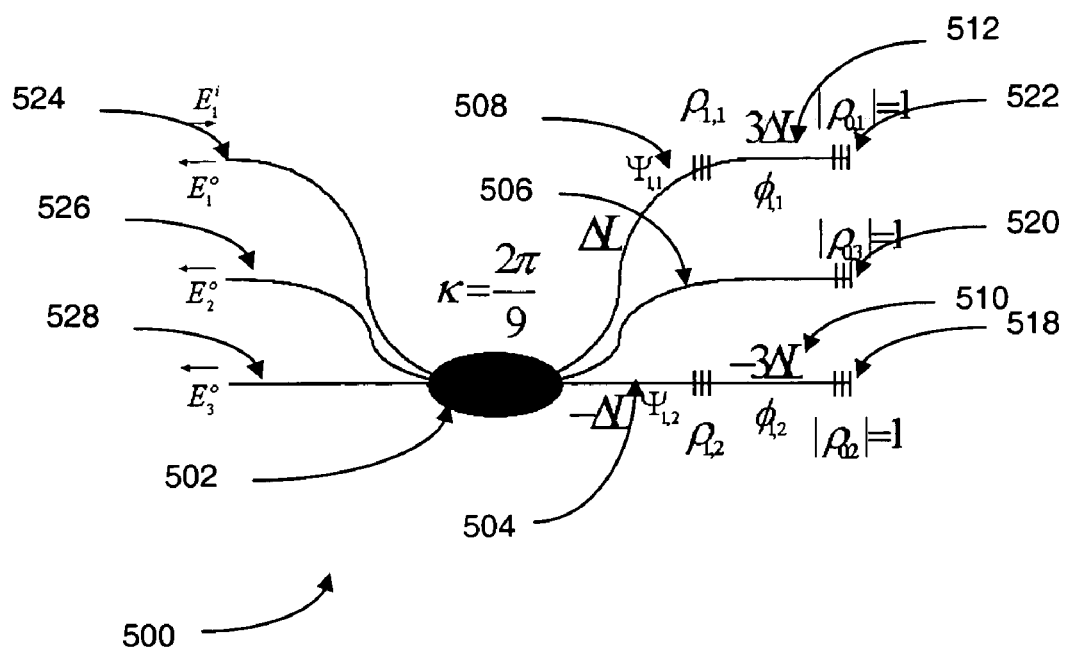
FIG. 5 is a schematic drawing illustrating the configuration of an interleaver in another embodiment.

FIG. 5 shows a three channel IIR optical interleaver 500 in another embodiment of the present invention. The interleaver 500 comprises one 3×3 directional coupler 502 linked port-to-port by three differential delay paths 504, 506, 508 respectively. The three delays off the delay paths 504, 506, 508 are chosen as ΔL, 0, −ΔL, respectively. The return length difference 2 ΔL determines the channel spacing of the interleaver 500, e.g. a length difference ΔL of around 1 mm corresponds to 0.8 mm channel spacing where the respective index of the fibre, n is 1.476. Two of the delay paths 504, 508 include etalon cavities 510, 512 respectively. The path lengths difference between the partial reflectors 514, 516 and all-pass reflectors 518, 520 of the etalon cavities structures 510, 512 respectively are selected as 3 ΔL. In each etalon cavity 510, 512 a phase shift is introduced. The delay path 506 includes one all-pass reflector 522.

In the example embodiment, the partial and all-pass reflectors e.g. 516, 520 comprise Bragg gratings written into optical delay paths 504, 506 and 508, which are in the form of optical fibres in the example embodiment. In an alternative embodiment, the delay paths may be implemented as planar waveguides. In an alternative embodiment, the all-pass reflectors e.g. may be replaced by mirrors. In one such embodiment, the mirrors may be produced through deposition of a suitable material on spliced end-faces of the respective optical fibres of the optical delay paths 504, 506 and 508 respectively.

In the example embodiment, the three channels of transmission of the interleaver 500 are obtained from one input port to three output ports. For example, an input signal enters at arm 524 into the 3×3 coupler 502, with the three channel transmissions exiting at arms 524, 526 and 528 respectively, which in the example embodiment are in the form of optical fibres. It will be appreciated by a person skilled in the art that the input signal can be separated from the transmission channel at arm 524 utilising known optical devices, such as an optical circulator.

In the example embodiment shown in FIG. 5, transmission signals collected from one or more of the optical delay paths 504, 506 and 508 can be further analysed to obtain/monitor the transmission characteristic of the interleaver 500.

Again, the individual passbands in the transmission channels may be varied through appropriate design of the optical characteristics of the delay paths 504, 506 and 508, the cavity structures 510, 512, and the coupling characteristics of the 3×3 coupler 502.

For one embodiment in the present invention, the three channels of transmissions can be obtained from one input port to three output ports. Without loss of generality, transmissions from one input port $E_1^I$ respectively to three output ports $E_1^o$, $E_2^o$, and $E_3^o$ are considered. To obtain three channels of $2\pi/3$ phase-shifted but identical transmissions satisfying desired specifications, the interleaver is designed by choosing appropriate parameters including the coupling ratio $\kappa$ of the 3×3 fiber coupler, the phase shifts $\psi_{1,i}$ (i=1,2) in the differential arms, the phase shifts $\phi_{1,i}$ (i=1,2) in between the reflectors, and the reflectance of the partial reflectors $\rho_{1,i}$ (i=1,2). To this end, the three channels of transmissions are expressed into the functions of the design parameters.

First, it is known that for an 3×3 optical fiber coupler, the input optical fields and the output fields of a symmetric 3×3 coupler can be related by a 3×3 transfer matrix $M(\kappa)$ as follows:

$$\begin{pmatrix} E_1^o \\ E_2^o \\ E_3^o \end{pmatrix} = \begin{pmatrix} \gamma & \delta & \delta \\ \delta & \gamma & \delta \\ \delta & \delta & \gamma \end{pmatrix} \begin{pmatrix} E_1^I \\ E_2^I \\ E_3^I \end{pmatrix} = M(\kappa) \begin{pmatrix} E_1^I \\ E_2^I \\ E_3^I \end{pmatrix} \quad (20)$$

where $E_m^I$ and $E_m^o$ represent respectively the input field and the output field at the m-th port for (m=1,2,3). $|\gamma|^2$ and $|\delta|^2$ denote the through-port and the cross-port power coupling ratios of a 3×3 directional coupler. They are given by $\gamma = (e^{j2\kappa} + 2e^{-j\kappa})/3$ and $\delta = (e^{j2\kappa} - e^{-j\kappa})/3$, where j stands for $\sqrt{-1}$ and $\kappa$ is a production of the coupling coefficient c and the length of the coupling region L, i.e., $\kappa = c \times L$. As the three optical fibers are laid out symmetrically, the coupling coefficients between any pair of optical fibers are equal.

Figure 6:
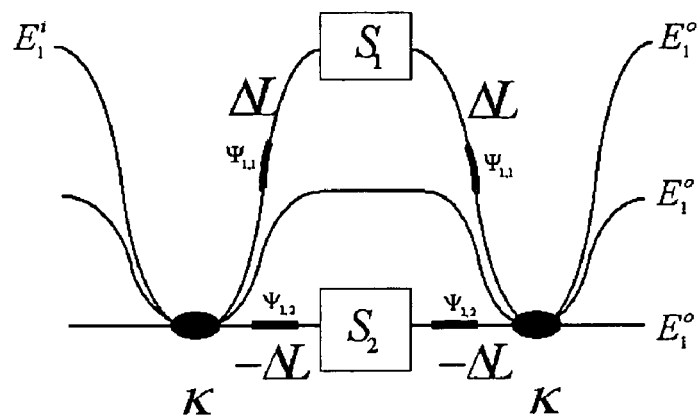
FIG. 6 is a schematic drawing illustrating a schematic equivalent configuration of the interleaver of FIG. 5.

Next, we derive the transfer function of the differential lines with the reflectors. The proposed embodiment structure can be replaced functionally by a structure shown in FIG. 6. Denote z as a unit time delay given by $z^{-1} = e^{-2j\Delta L \pi n/\lambda}$ where $\lambda$ is the wavelength of wave propagating through free space and n is the refractive index of the fiber. For convenience of derivation, we represent the round return transmissions of two cavity reflectors by $S_1(z)$ and $S_2(z)$, respectively. The lossless partial reflector with a phase shifter connected to an all reflection reflector is an all-pass filter. Its transfer function can be written as:

$$S_i(z^3) = e^{j\phi_{1,i}} \frac{\rho_{1,i} e^{-j\phi_{1,i}} - z^{-3}}{1 - \rho_{1,i} e^{j\phi_{1,i}} z^{-3}} \quad (21)$$

where $\rho_{1,i}$ is amplitude reflectance of the partial reflectors on the i-th (i=1,2) fiber arms. Since all $S_i(z)$ are functions of $z^{-3}$, they are denoted by $S_i(z^{-3})$ in the sub-sequential analysis for clarity.

Considering the differential delay caused by delay lines, the transmission of the differential delay lines with all-pass reflectors is obtained by $$D(z) = \begin{pmatrix} e^{2j\psi_{1,1}} z^{-1} S_1(z^3) & 0 & 0 \\ 0 & 1 & 0 \\ 0 & 0 & e^{2j\psi_{1,2}} z^1 S_2(z^3) \end{pmatrix} \quad (22)$$

Therefore, the normalized electric fields transfer functions from the three inputs to the three outputs can be expressed in the following transfer matrix:

$$\begin{pmatrix} E_1^o \\ E_2^o \\ E_3^o \end{pmatrix} = M(\kappa) D(z) M(\kappa) \begin{pmatrix} E_1^I \\ E_2^I \\ E_3^I \end{pmatrix} \quad (23)$$

Denote $H_1(z)$, $H_2(z)$, and $H_3(z)$ as the transmissions from one input port $E_1^I$ respectively to three output ports $E_1^o$, $E_2^o$, and $E_3^o$, respectively. They can be obtained in the following equations:

$$H_1(z) = e^{2j\psi_{1,1}} \gamma\gamma z^{-1} S_1(z^3) + \delta\delta + e^{2j\psi_{1,2}} \delta\delta z^1 S_2(z^3) \quad (24)$$

$$H_2(z) = e^{2j\psi_{1,1}} \gamma\delta z^{-1} S_1(z^3) + \delta\gamma + e^{2j\psi_{1,2}} \delta\delta z^1 S_2(z^3) \quad (25)$$

$$H_3(z) = e^{2j\psi_{1,1}} \gamma\delta z^{-1} S_1(z^3) + \delta\delta + e^{2j\psi_{1,2}} \delta\gamma z^1 S_2(z^3) \quad (26)$$

Then, the three channel optical interleaver design can be described as one of determining appropriate design parameters such that the power spectra of $|H_1(z)|^2$, $|H_2(z)|^2$, and $|H^3(z)|^2$ have a shift of $2\pi/3$ in frequency, but they have identical spectral shape, where $|H_i|^2 = H_i H_i^*$ (i=1, 2, 3) is the power transfer function in the proposed configuration. In addition, it is highly desired that the passbands and stopbands of $|H_1(z)|^2$, $|H_2(z)|^2$, and $|H_3(z)|^2$ are as much isolated as possible to achieve good channel isolation, and more importantly, they should be as flat as possible in order to reduce power variations resulting from channel wavelength shifts.

To meet the first requirement to have identical passband/stopband shape for all the three channels, the desired design parameters shall satisfy the following equations $|H_1(z)|^2 = |H_2(ze^{-j2\pi/3})|^2 = |H_3(ze^{-j4\pi/3})|^2$. Clearly, solving these equations imposes a great difficulty due to the complicate expressions of $S_i(z)$ (for i=1,2) and $H_i(z)$ (for i=1, 2, 3). However, thanks to the proposed structures of $S_i(z^3)$, we can solve the above equation in an efficient way. It is seen from FIG. 5 that the path length of all-pass reflectors are chosen as three times of the unit differential length in the proposed interleaver design structure. Such a structure implies that the frequency response of the ring resonators $S_i(z^3)$ (i=1,2) will not change with a shift of $2\pi/3$ or $4\pi/3$ in frequency. This can be seen directly from $S_i(z^3) = S_i((ze^{-j2\pi/3})^3) = S_i((ze^{-j4\pi/3})^3)$ for (i=1, 2). Using this property, the first requirement of an interleaver can be fulfilled by choosing only the design parameters $\kappa$. As a result, $\kappa = 2\pi/9$ can be obtained, and thus, we have $H_1(z)|_{\kappa=2\pi/9} = e^{j2\pi/3} H_2(ze^{-j2\pi/3})|_{\kappa=2\pi/9} = H_3(ze^{-j4\pi/3})|_{\kappa=2\pi/9}$. An immediate conclusion from this equation is that $|H_1(z)|^2$, $|H_2(z)|^2$, and $|H_3(z)|^2$ have identical shapes with only a phase shift of $2\pi/3$ between each of them. Therefore, the problem of the three-port optical IIR interleaver design is converted into one of designing $S_i(z)$ such that one channel transfer function, e.g. $|H_1(z)|^2$, satisfies the desired spectrum response. The filter design methods including those for design of Butterworth, Chebyshev and Elliptic bandpass filters can be employed to determine the remaining design parameters such that the interleaving transmissions have desired spectral responses such as high channel isolation, flat passband, and wide bandwidth.

For clear illustration, a design example is provided. The design specifications are selected as the same as the previous design example for the ring resonator embodiment. That is the proposed embodiment structure of the optical interleaver is designed to deliver three channels of transmissions that are interleaved by $2\pi/3$ with each other and each passband bandwidth is chosen as 85% of the channel spacing at $-0.5$ dB. Following the two steps design scheme developed in the last section, the coupling ratio of the 3×3 coupler is obtained first as $\kappa=2\pi/9$, so that the three channels of transmission are obtained and their transmissions are identical but shifted in phase by $2\pi/3$. Then, one of the transmission, e.g., $H_1(z)$, is designed to satisfy the passband requirement. Using the least-squares (LS) method, the desired transfer function of $H_1(z)$ can be obtained, and its numerator and denominator power expansion coefficients are listed in Table II.

TABLE II

| $k$ ($z^{-k}$) | Numerator power expansion coefficients | denominator power expansion coefficients | circuit parameters |
|---|---|---|---|
| 0 | 0.3651 | 1 | $\rho_{1,1} = 1.0000$ |
| 1 | 1 | 0 | $\rho_{1,2} = 0.3651$ |
| 2 | 1 | 0 | $\phi_{1,1} = 2.9443$ |
| 3 | 1 | 0.3651 | $\phi_{1,2} = -2.8356$ |
| 4 | 0.3651 | 0 | $\psi_{1,1} = 0$ |
|   |        |   | $\psi_{1,2} = -2.2625$ |
| 5 | 0.3651 | 0 | $\kappa = 2\pi/9$ |

Figure 7:
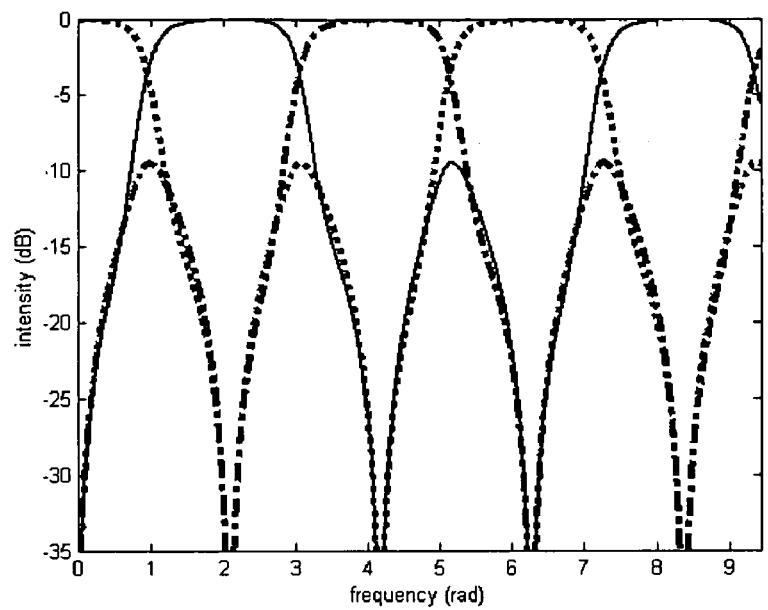
FIG. 7 shows power spectra of three outputs of the interleaver of FIG. 5.

Order of $z^{-k}$, Numerator Power Expansion Coefficients, Denominator Power Expansion Coefficients, and Circuit Parameters for IIR Three-Port Cavity Interleaver After obtaining the power expansion coefficients of $H_1(z)$, we determine the parameters of the reflectors. The partial reflectance and phases for each cavity are easily calculated from the all-pass functions. For example, to produce a pole at $Z_n$ requires a coupling ratio of $\rho_n=|z_n^3|$ and a phase of $\arg(z_n^3)$. Thus, the design parameters of $\rho_{1,i}$, $\phi_{1,i}$, and $\Psi_{1,i}$ (i=1,2) are obtained and shown in Table II. With these design parameters that we have obtained, an IIR three-port interleaver is obtained with the specified performance. FIG. 7 shows the interleaving transmission spectra of the designed IIR three-channel interleaver. Compared with the three-port IIR interleaver that is implemented with all-pass ring resonators structure, the proposed IIR interleaver has the same filter performance in terms of an 84.32% FOM, which is defined by a ratio between the bandwidth at $-25$ dB and the bandwidth at $-0.5$ dB. However, only one 3×3 coupler is used in the present invention configuration. Therefore, it can be concluded that the proposed invention provides a more efficient architecture for achieving the same filter performance. In addition, the proposed IIR interleaver also overcomes the difficulty in achieving a wider channel spacing of the interleaver, which is limited by banding radii in the ring resonator case.

Figure 8:
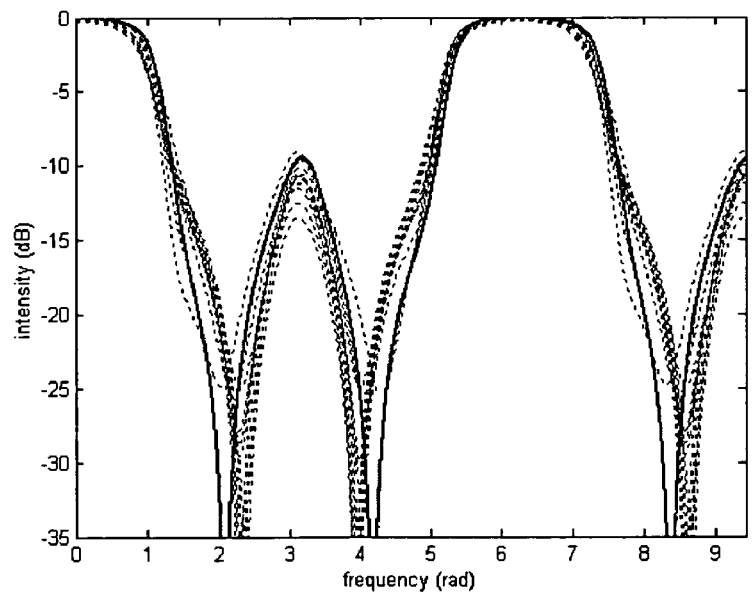
FIG. 8 shows one channel power spectra of the interleaver of FIG. 5 with design parameters bearing ±5% fabrication deviations in example embodiments.

Since the design parameters have the unavoidable deviations in fabrication and the fiber coupling may suffer from certain loss, simulation studies are carried out to investigate the sensitivity of the interleaver performance with respect to the design parameters and insertion loss of the couplers. In the simulation, 5% tolerant deviations are considered for the design parameters $\kappa$, $\rho_{1,i}$, $\phi_{1,i}$, and $\Psi_{1,i}$ (i=1,2), respectively. The coupling loss is considered by substituting $\eta z^{-3}$ for $z^{-3}$, where loss in decibels for one feedback path is $-20 \log 10(\eta)$. FIG. 8 shows the spectrum responses of the interleaver with the design parameters and the coupling loss changing in the tolerant range. The results have clearly shown that the performance of the proposed IIR interleaver is tolerant to both design parameters and coupling loss.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An optical interleaver comprising
   a first optical 3×3 coupler for receiving a broadband optical signal at one input port thereof,
   a second 3×3 optical coupler,
   three differential delay lines connected in parallel port-to-port between output ports of the first optical 3×3 coupler and input ports of the second optical 3×3 coupler,
   an infinite impulse response (IIR) element disposed in each of two of the delay lines, and
   wherein optical signals travelling in the respective delay lines interfere at the second 3×3 coupler to produce three frequency shifted transmission channel output signals at respective output ports of the second 3×3 coupler.

2. The optical interleaver as claimed in claim 1, wherein each IIR element comprises a ring resonator.

3. The optical interleaver as claimed in claim 2, wherein the ring resonators comprise optical fibres.

4. The optical interleaver as claimed in claim 1, wherein the 3×3 couplers comprise optical fibre couplers.

5. The optical interleaver as claimed in claim 1, wherein the optical 3×3 couplers comprise symmetrical 3×3 optical couplers.

6. An optical interleaver comprising
   an optical 3×3 coupler for receiving a broadband optical signal at one port thereof on one side thereof,
   three differential delay lines connected to respective ports at the other side of the optical 3×3 coupler,
   an infinite impulse response (IIR) element disposed in each of two of the delay lines,
   an all-pass reflector element disposed in each delay line, and
   wherein optical signals travelling in the respective delay lines interfere at the 3×3 coupler to produce three frequency shifted transmission channel output signals at respective ports on the first side of the 3×3 coupler.

7. The optical interleaver as claimed in claim 6, wherein each IIR element comprises an etalon cavity.

8. The optical interleaver as claimed in claim 7, wherein the etalon cavity comprises a partial reflector element at one end and the all-pass reflector element at the other end.

9. The optical interleaver as claimed in claim 8, wherein the partial reflector element comprises a Bragg grating.

10. The optical interleaver as claimed in any one of claims 7 to 9, wherein the all-pass reflector element comprises a Bragg grating or a mirror.

11. The optical interleaver as claimed in claims 1 or 6, wherein the differential delays between the three delay lines are $\Delta L$, 0, and $-\Delta L$.

12. The optical interleaver as claimed in claims 1 or 6, wherein the delay lines comprise optical fibres.

13. The optical interleaver as claimed in claims 1 or 6, wherein the three frequency shifted transmission channel output signals have a shift of $2\pi/3$ in frequency.

14. The optical interleaver as claimed in claim 6, wherein the optical 3×3 coupler comprises an optical fibre coupler.

15. The optical interleaver as claimed in claim 6, wherein the optical 3×3 coupler comprises a symmetrical 3×3 optical coupler.

16. A method of filtering a broadband optical signal, the method comprising
receiving the broadband optical signal at one input port of a first optical 3×3 coupler,
coupling the broadband optical signal into three differential delay lines connected in parallel port-to-port between output ports of the first optical 3×3 coupler and input ports of a second optical 3×3 coupler,
subjecting the coupled signals in two of the delay lines to an infinite impulse response (IIR) element, and
interfering the coupled signals in the three delay lines at the second 3×3 coupler to produce three frequency shifted transmission channel output signals at respective output ports of the second 3×3 coupler.

17. The method as claimed in claim 16, wherein the optical 3×3 couplers comprise symmetric optical 3×3 couplers.

18. A method of filtering a broadband optical signal, the method comprising
receiving the broadband optical signal at one port of an optical 3×3 coupler,
coupling the broadband optical signal into three differential delay lines connected to respective ports at the other side of the optical 3×3 coupler,
subjecting the coupled signals in two of the delay lines to respective infinite impulse response (IIR) elements,
reflecting the coupled signals in the three delay lines at respective all-pass reflector elements, and
interfere the coupled signals in the three delay lines at the 3×3 coupler to produce three frequency shifted transmission channel output signals at respective ports on the first side of the 3×3 coupler.

19. The method as claimed in claims 16 or 18, wherein the differential delays between the three delay lines are $\Delta L$, 0, and $-\Delta L$.

20. The method as claimed in claims 16 or 18, wherein the three frequency shifted transmission channel output signals have a shift of $2\pi/3$ in frequency.

21. The method as claimed in claim 18, wherein the optical 3×3 coupler comprises a symmetric optical 3×3 coupler.

* * * * *